United States Patent [19]

Kawachi et al.

[11] 4,440,879

[45] Apr. 3, 1984

[54] PROCESS FOR PREPARING FILLER-CONTAINING POLYTETRAFLUOROETHYLENE FINE POWDER

[75] Inventors: Shoji Kawachi, Nishinomiya; Katsutoshi Yamamoto, Settsu; Shinichiro Kai, Ibaraki, all of Japan

[73] Assignee: Daikin Kogyo Co., Ltd., Osaka, Japan

[21] Appl. No.: 235,622

[22] Filed: Feb. 18, 1981

[30] Foreign Application Priority Data

Feb. 2, 1980 [JP] Japan ................................. 55-18724

[51] Int. Cl.$^3$ .................... C08K 3/24; C08L 27/18; C08L 27/20
[52] U.S. Cl. ................................. 523/200; 523/334; 524/434; 524/435; 524/436; 524/437; 524/545; 524/904
[58] Field of Search ............... 523/200, 334; 524/545, 524/904, 435, 436, 437, 434

[56] References Cited

U.S. PATENT DOCUMENTS

| | | | |
|---|---|---|---|
| 3,880,798 | 4/1975 | Deem et al. | 523/200 |
| 3,915,916 | 10/1975 | Leverett | 524/506 |
| 3,980,596 | 9/1976 | Leverett | 524/440 |
| 3,980,612 | 9/1976 | Gangal | 524/440 |
| 4,138,375 | 2/1979 | Berg et al. | 523/334 |
| 4,241,137 | 12/1980 | Izumo et al. | 428/402 |

*Primary Examiner*—Allan Lieberman
*Attorney, Agent, or Firm*—Birch, Stewart, Kolasch & Birch

[57] ABSTRACT

A process for preparing filler-containing polytetrafluoroethylene fine powder which comprises mixing together an aqueous dispersion of particles of polytetrafluoroethylene and an aqueous dispersion of particles of a filler adsorbed with polyvalent cation at the surfaces so as to be charged positively in the presence of an anionic surfactant and a water-immiscible organic liquid to coagulate the polytetrafluoroethylene particles and the filler particles in combination and recovering the coagulated particles from the resultant dispersion mixture, said filler particles being per se chargeable negatively in water.

9 Claims, No Drawings

PROCESS FOR PREPARING FILLER-CONTAINING POLYTETRAFLUOROETHYLENE FINE POWDER

The present invention relates to a process for preparing filler-containing polytetrafluoroethylene (PTFE) fine powder. More particularly, it relates to a process for preparing filler-containing PTFE fine powder wherein the filler is uniformly dispersed in PTFE without separation.

For production of filler-containing PTFE fine powder, there is known the so-called "coagulation process" wherein the filler in a powdery state is dispersed into an aqueous dispersion of PTFE prepared by emulsion polymerization in an aqueous medium so as to coagulate PTFE together with the filler. The filler-containing PTFE fine powder prepared by this process is used, like PTFE fine powder not containing any filler, for manufacture of a molded product by paste extrusion or by calendering.

In the said coagulation process, there is usually employed a hydrophilic filler. In order to achieve the uniform mixing of such hydrophilic filler with PTFE which is hydrophobic, it is considered to be necessary to make the surfaces of the particles of the filler hydrophobic. In fact, there has been proposed a method for making the surfaces of the particles of the filler hydrophobic by treatment with a polyorganosiloxane or a condensed titanic ester (Japanese Patent Publn. (examined) No. 33253/1972), a cationic surfactant (Japanese Patent Publn. (examined) No. 12052/1973) or a chromium complex salt of a carboxylic acid (Japanese Patent Publn. (examined) No. 37576/1973). As a result, however, the treated filler is lowered in dispersibility into water and more or less coagulated. Thus, the dispersion of the filler at the primary particle level becomes difficult, and uniform mixing with PTFE is sometimes prevented.

The basic object of the present invention is to provide a filler-containing PTFE fine powder wherein the particles of PTFE and of the filler are uniformly mixed and separation of the particles of the filler therefrom does not occur. This object is attained by mixing together an aqueous dispersion of the particles of PTFE and an aqueous dispersion of the particles of a filler, which can be negatively charged in water, adsorbed with polyvalent cations at the surfaces of the particles to be charged positively in the presence of an anionic surfactant and a water-immiscible organic liquid to coagulate the particles of PTFE and the filler in combination, followed by recovering the coagulated particles from the dispersion mixture.

By the above process, uniform mixing of the hydrophobic PTFE particles and the hydrophilic filler particles can be easily attained. The reason for this is still uncertain but may be as follows: the negatively charged filler particles adsorb polyvalent cations at the surfaces thereof so as to be charged positively; the anion of the hydrophilic group in the anionic surfactant is adsorbed onto the positively charged surfaces of the filler particles whereby the filler particles are covered by the hydrophobic group bonding to the hydrophobilic group; and the hydrophobic group is previously bonded to the PTFE particles or, even if not, has an affinity to the PTFE particles so that the surfaces of the filler particles are bounded with the PTFE particles.

In the process of this invention, PTFE may be a homopolymer of tetrafluoroethylene or a copolymer of tetrafluoroethylene with any other polymerizable monomer (e.g. hexafluoropropylene, chlorotrifluoroethylene, perfluoroalkyl vinyl ether) as a modifier in an amount of not more than 2% by weight based on the weight of the copolymer. The aqueous dispersion of the PTFE particles preferably contains from 5 to 50% by weight, more preferably from 5 to 20% by weight, of the PTFE particle having an average particle size of from about $0.1$ to $0.3\mu$.

As the filler, there may be used any conventional one which is chargeable negatively in water. Specific examples are glass, bronze, zirconium silicate, mica, talc, aluminum oxide, iron oxide, lead oxide, asbestos, cadmium oxide, zirconium oxide, titanium oxide (rutile type), etc. These fillers usually have a particle size of $0.001$ to $200\mu$. The amount of the filler to be used may be from 5 to 60% by volume to the volume of PTFE.

Whether the particles of the filler are charged positively or negatively in an aqueous medium can be readily confirmed by electrophoresis. For instance, water is admitted in a beaker, and two electrodes which are respectively available as a positive electrode and a negative electrode are dipped therein. An aqueous dispersion of the filler particles is dropped at the intermediary point between the two electrodes, whereby the filler particles charged positively will be parcipitated while coming to the negative electrode. If the filler particles are charged negatively, they will be precipitated while coming to the positive electrode. When desired, the charge of the filler may be quantitatively determined by the use of a Tiselius' U-shape tube.

As the source of the polyvalent cation to be adsorbed on the surfaces of the filler particles so as to cause the particles to be charged positively, there may be used polyvalent metal salts such as aluminum salts, iron (ferrous and ferric) salts, magnesium salts, calcium salts, barium salts, copper (cupric) salts and zinc salts. Among them, aluminum salts are particularly preferred, because aluminum ion does not leave any coloring in the resulting product. These polyvalent metal salts may be used in the minimum amount necessary for causing the filler particles to be charged positively.

A typical procedure for determining such minimum amount is as follows: a determined amount of the filler is admitted in a test tube, and water and a polyvalent metal salt are added thereto, followed by shaking sufficiently; an anionic surfactant and a water-immiscible organic liquid are added thereto, and the resultant mixture is observed to determine whether the filler is transferred to the organic liquid layer. The amount of the polyvalent metal salt needed in order for the entire amount of the filler particles to transfer to the organic liquid layer may be considered as the minimum amount of the polyvalent metal salt to be employed.

According to the above procedure using powder of glass fiber (average diameter, $11\mu$; average length, $80\mu$) (10 g) as the filler, aluminum nitrate ($Al(NO_3)_3.9H_2O$) as the polyvalent metal salt ammonium perfluorooctanoate (0.01 g) as the anionic surfactant and petroleum benzin (5 ml) as the organic liquid, the relationship of the amount of aluminum nitrate with the transference of the glass fiber powder to the petroleum benzin layer was determined, and the results are shown in the following table, from which it is understood that the minimum amount of aluminum nitrate is 0.005 g to 10 g of glass fiber powder:

TABLE 1

| Aluminum nitrate (g) | State of glass fiber powder |
| --- | --- |
| 0 | entire powder precipitated |
| 0.0001 | partly transferred to the organic liquid layer and partly dispersed in the water layer |
| 0.005 | entire powder transferred to the organic liquid layer |
| 0.01 | entire powder transferred to the organic liquid layer |
| 0.8 | entire powder transferred to the organic liquid layer |

Likewise, the relationship of the amount of aluminum nitrate with the transference of red iron oxide powder ("R-110-2" manufactured by Titanium Industry Co., Ltd.) (5 g) used as the filler instead of the glass fiber powder to the petroleum benzin layer was determined, and the results are shown in the following table, from which it is understood that the minimum amount of aluminum nitrate is 0.005 g to 5 g of red iron oxide powder:

| Aluminum nitrate (g) | State of red iron oxide powder |
| --- | --- |
| 0 | entire powder precipitated |
| 0.0001 | partly dispersed in the water layer |
| 0.005 | entire powder transferred to the organic liquid layer |
| 0.01 | entire powder transferred to the organic liquid layer |
| 0.1 | entire powder transferred to the organic liquid layer |

Since the filler itself is hydrophilic, its aqueous dispersion can be readily produced by dispersing the particles of the filler into an aqueous medium (usually water) with the aid of a conventional mixing machine. Addition of the polyvalent cation source such as a polyvalent metal salt to the resultant aqueous dispersion affords an aqueous dispersion comprising the positively charged particles of the filler, which is to be admixed with an aqueous dispersion of PTFE. The content of the filler in the aqueous dispersion of the filler may be from 1 to 120 parts by volume based on 100 parts by volume of the aqueous medium (e.g. water).

Mixing of the above prepared aqueous dispersion of the PTFE particles and the above prepared aqueous dispersion of the positively charged filler particles may be effected by combining them together, followed by agitation. Usually, the use of a coagulating agent is not required, because the coagulation of the PTFE particles and the filler particles starts immediately after the mixing. The start of the coagulation can be readily determined by detecting the rapid increase of the viscosity of the dispersion mixture, for instance, by the aid of a torque meter equipped on the agitator. After the viscosity reaches the maximum, it is lowered quickly, at which the coagulated particles are precipitated. When the viscosity again becomes constant, the agitation is stopped. The coagulated particles are precipitated or floated in the aqueous medium.

On the above mixing operation, the presence of an anionic surfactant and a water-immiscible organic liquid is essential. Their presence is effective in preventing the separation of the filler particles from the coagulated particles with PTFE and also in forming globular coagulated particles globular.

The anionic surfactant may be added to the mixture of the aqueous dispersions of the PTFE particles and the filler particles but is usually previously included in at least one of the aqueous dispersions of the PTFE particles or the filler particles. In the case that the anionic surfactant is to be included in the aqueous dispersion of the PTFE particles, there may be preferably used the aqueous dispersion of PTFE obtained by emulsion polymerization of tetrafluoroethylene with or without any modifier monomer in an aqueous medium containing an anionic surfactant as the emulsifier. When the aqueous dispersion of PTFE is prepared by the use of a nonionic surfactant as the emulsifier, an anionic surfactant may be incorporated therein. In the case that the anionic surfactant is to be included in the aqueous dispersion of the filler particles, it is added to the aqueous dispersion of the filler after being charged positively.

As the anionic surfactant, there may be used any conventional one such as a higher fatty acid salt, an alkylsulfate, an alkylarylsulfate, an alkylsulfonate, an alkylarylsulfonate or an alkylphosphate. Particularly preferred in a fluorine-containing carboxylate or sulfonate anionic surfactant having a perfluoroalkyl or perfluorochloroalkyl group, of which examples are those of the following formulas:

$$X(CF_2CF_2)_nA$$

$$X(CF_2CF_2)_nCH_2A$$

$$X(CF_2CFCl)_nA$$

(wherein X is hydrogen, fluorine or chlorine, A is —COOH or —SO$_3$H, or the residue of its alkali metal or ammonium salt and n is an integer of 3 to 10). The amount of the anionic surfactant to be used may be usually from 0.01 to 5% by weight to the weight of PTFE. These fluorine-containing surfactants are sublimated on heating so that they do not remain in the ultimate product.

As the water-immiscible organic liquid, there is preferably used the one having a boiling point of 30° to 150° C. and a surface tension of not more than 35 dyne/cm. Specific examples are hydrocarbons (e.g. hexane, heptane, gasoline, lamp oil, toluene), chlorinated hydrocarbons (e.g. carbon tetrachloride, trichloroethylene) fluorinated hydrocarbons (e.g. trichlorotrifluoroethane, difluorotetrachloroethane, fluorotrichloromethane), etc. Among them, trichlorotrifluoroethane is particularly preferred. The amount of the water-immiscible organic liquid may be from 30 to 100 parts by weight to 100 parts by weight of the solid components.

Recovery of the coagulated particles from the dispersion mixture is readily accomplished by a conventional separation procedure.

The thus recovered coagulated particles, which usually have an average particle size of 200 to 5000μ, possess a good flowing property and do not produce any block or lump after drying. Thus, they are easily handled. In fact, they are readily shaped into a sheet, a tube, a stick, etc. by a conventional operation for paste extrusion or calendering.

As understood from the above, the process of this invention makes it possible to mix the PTFE particles and the filler particles uniformly without separation. It may be noted that filler-containing PTFE fine powder can be obtained by simple continuous operations in a single vessel within a short time. The obtained filler-containing PTFE fine powder can advantageously contain a relatively large amount of the filler and/or have a relatively large specific gravity without separation.

Practical embodiments of the present invention are illustratively shown in the following Examples, wherein part(s) and % are by weight, unless otherwise indicated.

EXAMPLES 1-6 AND COMPARATIVE EXAMPLES 1-7

Into a 5000 ml volume cylindrical vessel of 180 mm in diameter equipped with an anchor type agitator of 80 mm in rotation outer diameter at a distance of 50 mm from the bottom, water (1000 ml) was charged, and powder of glass fiber of $11\mu$ in average diameter and $80\mu$ in average length (60 g) was added thereto while agitation. To the resultant mixture, aluminium nitrate $(Al(NO_3)_3.9H_2O)$ in an amount as shown in Table 3 was added, and an aqueous dispersion of PTFE having a solid content of 25% (960 g) prepared by emulsion polymerization using ammonium perfluorooctanoate as a dispersing agent was added thereto under agitation. The viscosity of the mixture was increased rapidly and reached the maximum within a period of 15 to 30 seconds. Then, the viscosity dropped down, and after 1 to 5 minutes, a coagulated product started to float. Agitation was further continued for about 5 minutes and stopped.

On the above coagulation, trichlorotrifluoroethane (hereinafter referred to as "F-113") in an amount as shown in Table 3 was added to the mixture in case of Examples at the following stage:

I: before the start of the increase of the viscosity;
II: between the maximum of the viscosity and the floating of the coagulated product;
III: after the floating of the coagulated product.

After the agitation was stopped, the coagulated product was collected by filtration using a metal net of 100 mesh and dried at 120° C. The weight of the glass fiber powder in the filtrate was measured. The apparent density (g/ml) and the average particle size ($\mu$) were measured, and the results are shown in Table 3 wherein aluminium nitrate was not used in Comparative Examples 1 and 7 and F-113 was not used in Comparative Examples 1, 2, 4, 5 and 6.

TABLE 3

|  | Aluminum nitrate (g) | F-113 Stage added | F-113 Amount (g) | Glass fiber powder separated (g) | Produced powder Apparent density (g/ml) | Produced powder Average particle size ($\mu$) |
|---|---|---|---|---|---|---|
| Example 1 | 0.5 | II | 60 | 1 | 0.52 | 1600 |
| Example 2 | 2 | II | 50 | 1 | 0.44 | 1000 |
| Example 3 | 8 | II | 100 | 1 | 0.71 | 620 |
| Example 4 | 2 | II | 150 | 1 | 0.74 | 650 |
| Example 5 | 5 | III | 150 | 1 | 0.71 | 550 |
| Example 6 | 5 | I | 150 | 1 | 0.79 | 580 |
| Comparative Example 1 | — | — | — | 51 | — | — |
| Comparative Example 2 | 0.1 | — | — | 52 | — | — |
| Comparative Example 3 | 0.1 | III | 75 | 50 | 0.49 | 840 |
| Comparative Example 4 | 0.5 | — | — | 38 | — | — |
| Comparative Example 5 | 2 | — | — | 41 | — | — |
| Comparative Example 6 | 8 | — | — | 47 | — | — |
| Comparative Example 7 | — | II | 75 | 49 | — | — |

The powder (100 parts) obtained in any of Examples 1 to 6 was admixed with naphtha (16.5 parts), and the resultant paste was extruded with a reduction ratio of 250 and an extrusion speed of 8 mm/minute to give a tube of 5 mm in outer diameter and 4 mm in inner diameter, which was baked at 380° C. for 20 minutes. The tube was subjected to measurement of tensile load at break and elongation according to JIS (Japanese Industrial Standard) K 6892 (1976). The results are shown in Table 4.

TABLE 4

| Powder | Extrusion pressure (kg) | Tensile load at break (kg) | Elongation (%) |
|---|---|---|---|
| Powder of Example 1 | 3450 | 9.1 | 180 |
| Powder of Example 3 | 3390 | 8.9 | 175 |
| Powder of Example 5 | 3580 | 8.7 | 170 |
| Powder of Example 6 | 3200 | 9.2 | 185 |
| Powder of Example 8 | 3250 | 9.1 | 175 |

EXAMPLE 7

Glass fiber powder-containing PTFE fine powder was prepared in the same manner as in Example 4 but using 120 g of glass fiber powder and incorporating previously ammonium perfluorooctanoate (1 g) into the aqueous dispersion of PTFE. The glass fiber powder was not substantially contained in water. The apparent density of the obtained powder was 0.76 g/ml, and the average particle size was $620\mu$.

EXAMPLE 8

Glass fiber powder-containing PTFE fine powder was prepared in the same manner as in Example 6 but using perchloroethylene as the organic liquid. The obtained powder had an apparent density of 0.75 g/ml and an average particle size of $760\mu$. As in Examples 1 to 6, the powder was subjected to paste extrusion, and the extruded product was baked and subjected to measurement of physical properties, of which the results are shown in Table 4.

EXAMPLE 9

Into the same vessel as in Example 1, water (200 ml) was charged, and glass fiber powder (60 g) and aluminum nitrate (0.06 g) were added thereto, followed by agitation. After addition of ammonium perfluorooctanoate (0.2 g), agitation was effected. To the resulting mixture, petroleum benzin (100 ml) was added, and agitation was carried out, whereby the glass fiber powder was transferred to the petroleum benzin layer and floated therein. The same aqueous dispersion of PTFE as used in Example 1 (1000 ml) was added thereto, and agitation was effected. The resultant mixture was filtered, and the separation of the glass fiber powder was not observed in the filtrate.

COMPARATIVE EXAMPLE 8

The same procedure as in Example 9 but using no petroleum benzin was effected. In the filtrate, the separation of glass fiber powder (37 g) was observed.

EXAMPLES 10-13, COMPARATIVE EXAMPLES 9-10 AND REFERENCE EXAMPLES 1-4

The same procedure as in Examples 1 to 6 but using the filler and the polyvalent cation source as shown in Table 5 was carried out. The results are shown in Table 5.

TABLE 6

| Powder | Amount of naphtha used (g) | Extrusion pressure (kg) | Tensile load at break (kg) | Elongation (%) |
|---|---|---|---|---|
| Powder of Example 11 | 10 | 3250 | 11.0 | 224 |
| Powder of Example 13 | 20 | 2300 | 11.5 | 230 |

EXAMPLE 14

The same procedure as in Example 9 but using ferric chloride ($FeCl_3.6H_2O$) (2 g) in place of aluminium nitrate (0.06 g) and effecting addition of petroleum benzin at the stage II was repeated. Separation of glass fiber powder in the filtrate was not observed. The obtained powder colored slightly due to ferric ion.

EXAMPLE 15

The same procedure as in Example 9 but using magnesium chloride ($MgCl_2.6H_2O$) (4 g) in place of aluminium nitrate (0.06 g) and effecting addition of petroleum benzin at the stage II was repeated. Separation of glass fiber powder in the filtrate was less than 5 g.

EXAMPLE 16

The same procedure as in Example 9 but using sodium laurylsulfate in place of ammonium perfluorooctanoate was repeated. Separation of glass fiber powder in the filtrate was less than 5 g.

TABLE 5

| | Filler (g) | Polyvalent cation source (g) | F-113 Stage added | F-113 Amount (g) | amount of filler separated (g) | Obtained powder Apparent density (g/ml) | Obtained powder Average particle size (μ) |
|---|---|---|---|---|---|---|---|
| Example 10 | Bronze*1 (300) | Al(NO3)3.9H2O (3) | III | 150 | 1 | 0.90 | 490 |
| Example 11 | Bronze (300) | AlCl.6H2O (2) | II | 150 | 1 | 0.95 | 1100 |
| Example 12 | Alumina*2 (300) | AlCl.6H2O (3) | II | 150 | 1 | 0.56 | 1050 |
| Example 13 | Red iron*3 oxide (50) | AlCl.6H2O (2.5) | II | 150 | 1 | 0.52 | 1050 |
| Comparative Example 9 | Bronze (300) | — | — | — | 290 | — | — |
| Comparative Example 10 | Bronze (300) | Al(NO3)3.9H2O (6) | — | — | 280 | — | — |
| Reference Example 1 | Titanium*4 oxide (15) | — | — | — | 1 | 0.42 | 400 |
| Reference Example 2 | Titanium oxide (15) | — | II | 100 | 1 | 0.53 | 810 |
| Reference Example 3 | γ-Alumina*5 (15) | — | — | — | 1 | 0.41 | 390 |
| Reference Example 4 | γ-Alumina (15) | — | II | 100 | 1 | 0.55 | 740 |

Note:
*1 Particle size, 350 mesh pass;
*2 α-alumina, "Sumitomo Alumina A-21" manufactured by Sumitomo Metal Industries, Ltd.;
*3 "R-110-2" manufactured by Titanium Industry, Co., Ltd.;
*4 "Titanium dioxide P 25" (anatase type titanium oxide) manufactured by Nihon Aerosil Co., Ltd.;
*5 "Aluminum oxide C" manufactured by Nihon Aerosil Co., Ltd.

Titanium oxide and γ-alumina used as the fillers in Reference Examples 1 to 4 are charged positively in water. Thus, they can be admixed uniformly with PTFE particles without cation treatment or coexistence of any organic solvent and are not separated into the filtrate.

As in Examples 1 to 6 but using naphtha in an amount as shown in Table 6, the powder obtained in Example 11 or 13 was subjected to paste extrusion. The extruded product was baked and subjected to measurement of physical properties. The results are shown in Table 6.

What is claimed is:

1. A process for preparing filler-containing polytetrafluoroethylene fine powder, comprising the steps of: mixing together an aqueous dispersion containing 5 to 50% by weight of particles of polytetrafluoroethylene having an average particle size of from about 0.1 to 0.3μ and an aqueous dispersion containing 1 to 120 parts by volume based upon 100 parts by volume of aqueous medium of filler particles having an average particle size of from 0.001 to 200μ adsorbed with polyvalent cations selected from the group consisting of aluminum ions, iron ions, magnesium ions, calcium ions, barium ions, copper ions and zinc ions at the surface thereof so as to be charged positively in the presence of an anionic surfactant and 30 to 100 parts by weight to 100 parts by weight of the solid components of a water-immiscible liquid having a boiling point of 30° to 150° C. and a surface tension of not more than 35 dyne/cm to coagulate the polytetrafluoroethylene particles and the filler particles in combination, wherein the amount of the filler is from 5 to 60% by volume to the volume of polytetrafluoroethylene and the content of the filler in the aqueous dispersion is from 1 to 120 parts by volume based upon 100 parts by volume of aqueous medium; and recovering the coagulated particles from the resultant dispersion mixture, said filler particles being per se negatively chargeable in water.

2. The process according to claim 1, wherein the aqueous dispersion of polytetrafluoroethylene particles contains 5 to 20% by weight of polytetrafluoroethylene particles.

3. The process according to claim 1, wherein said polyvalent cations are aluminum cations.

4. The process according to claim 1, wherein said filler particles are a powder of glass fiber.

5. The process according to claim 1, wherein the anionic surfactant is present in an amount of 0.01 to 5% by weight based on the weight of the polytetrafluoroethylene.

6. The process according to claim 1, wherein the filler particles are selected from the group consisting of glass, bronze, zirconium silicate, mica, talc, aluminum oxide, iron oxide, lead oxide, asbestos, cadmium oxide, zirconium oxide and titanium oxide.

7. The process according to claim 1, wherein said water-immiscible liquid is selected from the group consisting of hydrocarbons, chlorinated hydrocarbons and fluorinated hydrocarbons.

8. The process according to claim 1, wherein said water-immiscible liquid is trichlorotrifluoroethane.

9. A process for preparing filler-containing polytetrafluoroethylene fine powder, comprising the steps of: mixing together an aqueous dispersion containing 5 to 50% by weight of particles of polytetrafluoroethylene having an average particle size of from about 0.1 to 0.3$\mu$ and an aqueous dispersion containing 1 to 120 parts by volume based upon 100 parts by volume of aqueous medium of filler particles having an average particle size of from 0.001 to 200$\mu$ selected from the group consisting of glass, bronze, zirconium silicate, mica, talc, aluminum oxide, iron oxide, lead oxide, asbestos, cadmium oxide, zirconium oxide and titanium oxide adsorbed with polyvalent cations selected from the group consisting of aluminum ions, iron ions, magnesium ions, calcium ions, barium ions, copper ions and zinc ions at the surface thereof so as to be charged positively in the presence of 0.01 to 5% by weight based on the weight of the polytetrafluoroethylene of an anionic surfactant and 30 to 100 parts by weight to 100 parts by weight of the solid components of a water-immiscible liquid having a boiling point of 30° to 150° C. and a surface tension of not more than 35 dyne/cm to coagulate the polytetrafluoroethylene particles and the filler particles in combination, wherein the amount of the filler is from 5 to 60% by volume to the volume of polytetrafluoroethylene and the content of the filler in the aqueous dispersion is from 1 to 120 parts by volume based upon 100 parts by volume of aqueous medium; and recovering the coagulated particles from the resultant dispersion mixture, said filler particles being per se negatively chargeable in water.

* * * * *

UNITED STATES PATENT AND TRADEMARK OFFICE
CERTIFICATE OF CORRECTION

PATENT NO. : 4,440,879
DATED : April 3, 1984
INVENTOR(S) : Kawachi et al

It is certified that error appears in the above-identified patent and that said Letters Patent is hereby corrected as shown below:

On the title page, under section [30] entitled "Foreign Application Priority Data", change "Feb. 2, 1980" to --Feb. 18, 1980--.

Signed and Sealed this

Eighteenth Day of September 1984

[SEAL]

Attest:

GERALD J. MOSSINGHOFF

Attesting Officer

Commissioner of Patents and Trademarks